(12) United States Patent
Rizzi

(10) Patent No.: US 6,364,064 B1
(45) Date of Patent: Apr. 2, 2002

(54) PIEZOCERAMIC ELEVATOR VIBRATION ATTENUATOR

(75) Inventor: Liberato Rizzi, Clinton, NJ (US)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 09/521,062

(22) Filed: Mar. 8, 2000

(51) Int. Cl.[7] ............................................. B66B 1/34
(52) U.S. Cl. ....................................................... 187/292
(58) Field of Search ................................ 187/292, 393; 318/116, 611, 623

(56) References Cited

U.S. PATENT DOCUMENTS

| | | | | |
|---|---|---|---|---|
| 4,589,133 A | * | 5/1986 | Swinbanks | 381/71 |
| 5,027,925 A | * | 7/1991 | Kahikipuro | 187/115 |
| 5,036,955 A | * | 8/1991 | Nakai et al. | 187/107 |
| 5,135,079 A | * | 8/1992 | Shimazaki | 187/1 R |
| 5,219,037 A | | 6/1993 | Smith et al. | 180/312 |
| 5,281,899 A | * | 1/1994 | Culp | 318/116 |
| 5,294,757 A | * | 3/1994 | Skalski et al. | 187/115 |
| 5,368,132 A | * | 11/1994 | Hollowell et al. | 187/393 |
| 5,378,974 A | | 1/1995 | Griffin | |
| 5,730,429 A | | 3/1998 | Ivers et al. | 267/140.14 |
| 5,811,743 A | * | 9/1998 | Kohara et al. | 187/393 |
| 5,826,864 A | | 10/1998 | Barger | |

FOREIGN PATENT DOCUMENTS

| | | |
|---|---|---|
| EP | 0 309 211 | 3/1989 |
| EP | 0 593 296 | 4/1994 |
| FR | 2 677 415 | 12/1992 |
| FR | 2 761 437 | 10/1998 |
| GB | 2 234 318 | 1/1991 |
| JP | 020 21 044 | 1/1990 |

* cited by examiner

Primary Examiner—Jonathan Salata
(74) Attorney, Agent, or Firm—Cohen, Pontani, Lieberman & Pavane

(57) ABSTRACT

An apparatus for actively controlling transmission of vibration energy to a movable platform, such as an elevator floor, attached to a carriage for transporting the movable platform. The apparatus includes a passive vibration attenuator for passively absorbing vibration energy transmitted through the carriage. Also included is a vibration sensor having a first piezoelectric material and connected in series with the passive vibration attenuator. The vibration sensor is configured to generate an electrical signal in response to deformation of the vibration sensor caused by vibration energy transmitted through the passive vibration attenuator. An inverter for inverting the electrical signal from the vibration sensor and outputting an inverted electrical signal that is equal in magnitude and opposite in polarity to the electrical signal from the vibration sensor. A vibration generator, responsive to the inverted electrical signal and connected in series with the vibration sensor, is comprised of a second piezoelectric material for transmitting a vibration force to substantially cancel the vibration energy transmitted through the passive vibration attenuator.

12 Claims, 2 Drawing Sheets

PIEZOCERAMIC ELEVATOR VIBRATION ATTENUATOR

BACKGROUND OF THE INVENTION

1. Field of the Invention

The present invention relates to vibration control and, in particular, an apparatus and method for controlling vibration of a movable platform, such as an elevator cab.

2. Description of the Related Art

Vibration control isolation and mounting systems are well known in the art, including passive, fluid, and active systems. Passive systems utilize passive isolating devices such as mountings and spring and shock absorber arrangements to isolate a suspended member from shock and vibration inputs.

U.S. Pat. Nos. 4,811,919, 5,197,692, and 5,127,607 disclose fluid mountings and fluid systems for improving vibration isolation. In particular, the fluid mountings utilize tuned fluid inertial forces to provide a tuned resonant frequency and non-linear mount characteristics. Although these fluid mountings and systems provide improved isolation as compared to passive systems, they still provide inadequate isolation for some applications because the fluid tunability has only a limited tuning range and the stiffness cannot be zero at the tuned frequency.

For optimum isolation, active forces need to be developed which are added to, or subtracted from, the input disturbances in the proper phase relationship to minimize transmitted vibration regardless of the frequency of the disturbance. U.S. Pat. No. 5,174,552 is an example of such an active system. Although this system provides superior isolation, it utilizes fluid as the active actuator medium, which may not be desired in some applications.

U.S. Pat. No. 4,624,435 describes a dry system including a resilient vibration isolator and an electro-magnetically controllable vibration damping arrangement. U.S. Pat. No. 5,219,037 also includes an electromagnetic actuator including a first elastomer section and a second elastomer section. The first section is stiff radially and soft axially for protecting the actuator from side loads. The second elastomer section accommodates shear motions in the mounting. In Smith, an elastomer is shown placed in series-spring relationship with the actuator; however, no mention is made of the characteristics of the elastomer. Furthermore, these voice coil systems are typically used for higher amplitude and relatively low force applications. This is because voice coil actuators do not function adequately at low amplitudes.

SUMMARY OF THE INVENTION

An object of the present invention is to isolate a movable platform from vibration forces transmitted to the movable platform.

According to an aspect of the invention, the movable platform is the floor of an elevator cab. One or more supports attach the elevator cab to a carriage, which is connected to a drive mechanism for transporting the elevator cab. Each support includes a piezoelectric element and a passive vibration attenuator so as to actively isolate the elevator cab from drive-mechanism generated vibration transmitted through the carriage. The piezoelectric element is preferably connected in series with the passive vibration attenuator so as to substantially cancel out any vibration transmitted through the passive vibration attenuator.

In one embodiment, there is provided an apparatus for actively controlling transmission of vibration energy to a movable platform mounted to a carriage for transporting the movable platform. The apparatus includes a passive vibration attenuator for passively absorbing vibration energy transmitted through the carriage. Also included is a vibration sensor comprised of a first piezoelectric material and connected in series with the passive vibration attenuator. The vibration sensor is configured to generate an electrical signal in response to deformation of the vibration sensor caused by vibration energy transmitted through the passive vibration attenuator. An inverter inverts the electrical signal from the vibration sensor and outputs an inverted electrical signal that is equal in magnitude and opposite in polarity to the electrical signal from the vibration sensor. A vibration generator, responsive to the inverted electrical signal and connected in series with the vibration sensor, is comprised of a second piezoelectric material for transmitting a vibration force to substantially cancel the vibration energy transmitted through the passive vibration attenuator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PRESENTLY PREFERRED EMBODIMENTS

Figure 1:
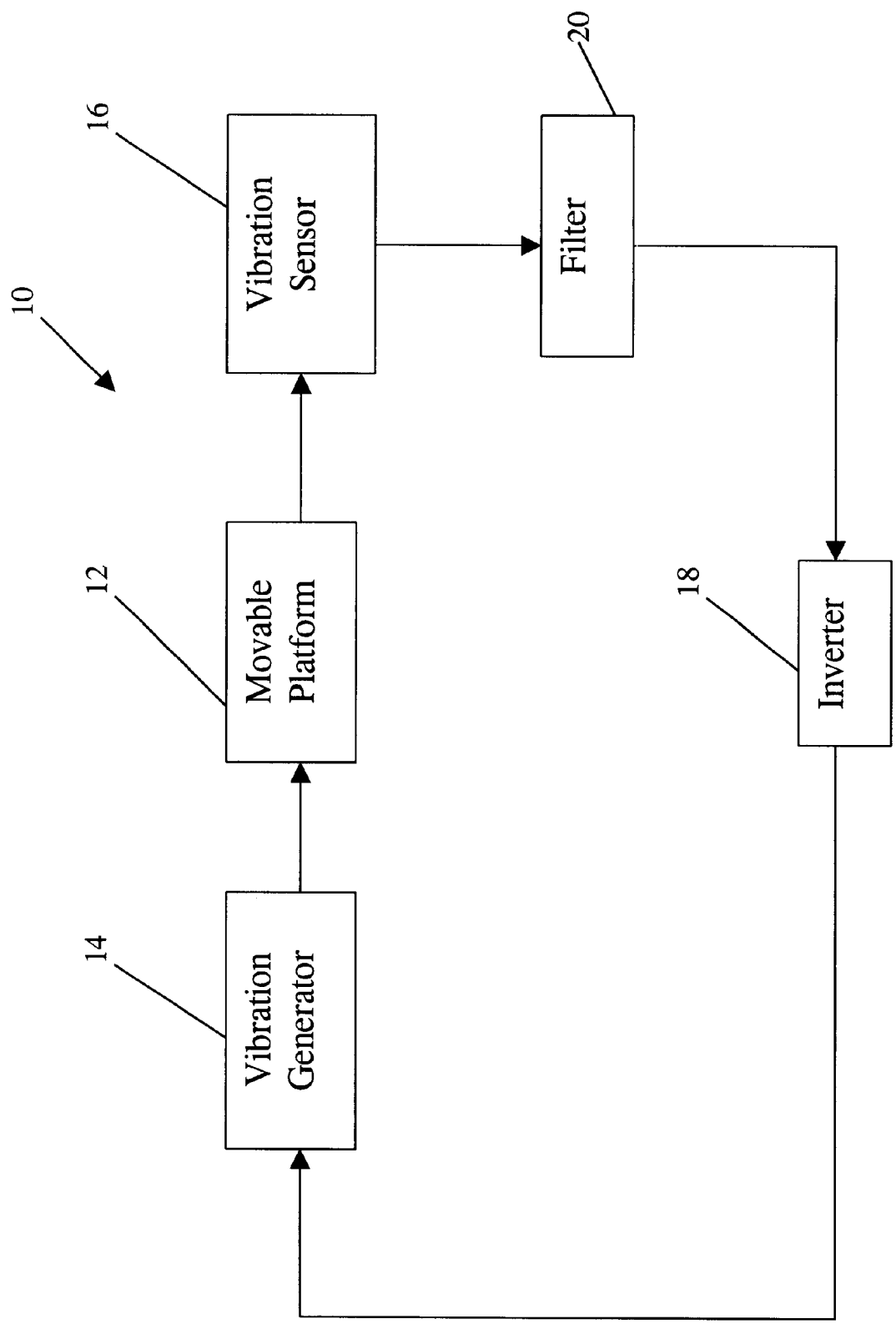
FIG. 1 is a block diagram of the vibration control system according to one embodiment of the present invention.

FIG. 1 diagrammatically illustrates an embodiment of the vibration control system 10 of the present invention for controlling vibration of a movable platform 12 such as the floor of an elevator cab. The system 10 includes a vibration generator 14, a vibration sensor 16, and an inverter 18. Preferably, each of the vibration sensor 16 and the vibration generator 14 comprises a piezoelectric material such as piezoceramic formed as a sheet-like structure. The piezoelectric material is constructed such that deformation (e.g., expansion or contraction) of the material generates a voltage signal indicative of the force causing such deformation, while on the other hand, application of a voltage signal to the material causes the material to deform. Thus, the piezoelectric material may be employed to generate a force (i.e., a force actuator) or to detect an applied force (i.e., a force sensor).

The system 10 preferably includes a filter 20 such as, for example, a low pass filter connected to the vibration sensor 16 for filtering out vibration energy of selected frequencies. The cutoff frequency may be selected such that vibration energies of frequencies higher than the cutoff frequency do not affect, for example, the comfort level of the occupants of the elevator cab.

The inverter 18, which may be connected to the output of the filter 20 (or, for a system without the filter 20, to the output of the vibration sensor 16) inverts the electric signal (either from the vibration sensor 16 or the filter 20) and outputs an inverted signal to the vibration generator 14. The inverted signal is of the same magnitude but opposite in polarity to the electrical signal inputted to the inverter 18.

Advantageously, the vibration generator 14, responsive to the inverted signal from the inverter 18, outputs equal and opposite vibration forces that substantially cancel out the vibration forces transmitted to the platform 12 from, for example, the elevator drive mechanism.

Figure 2:
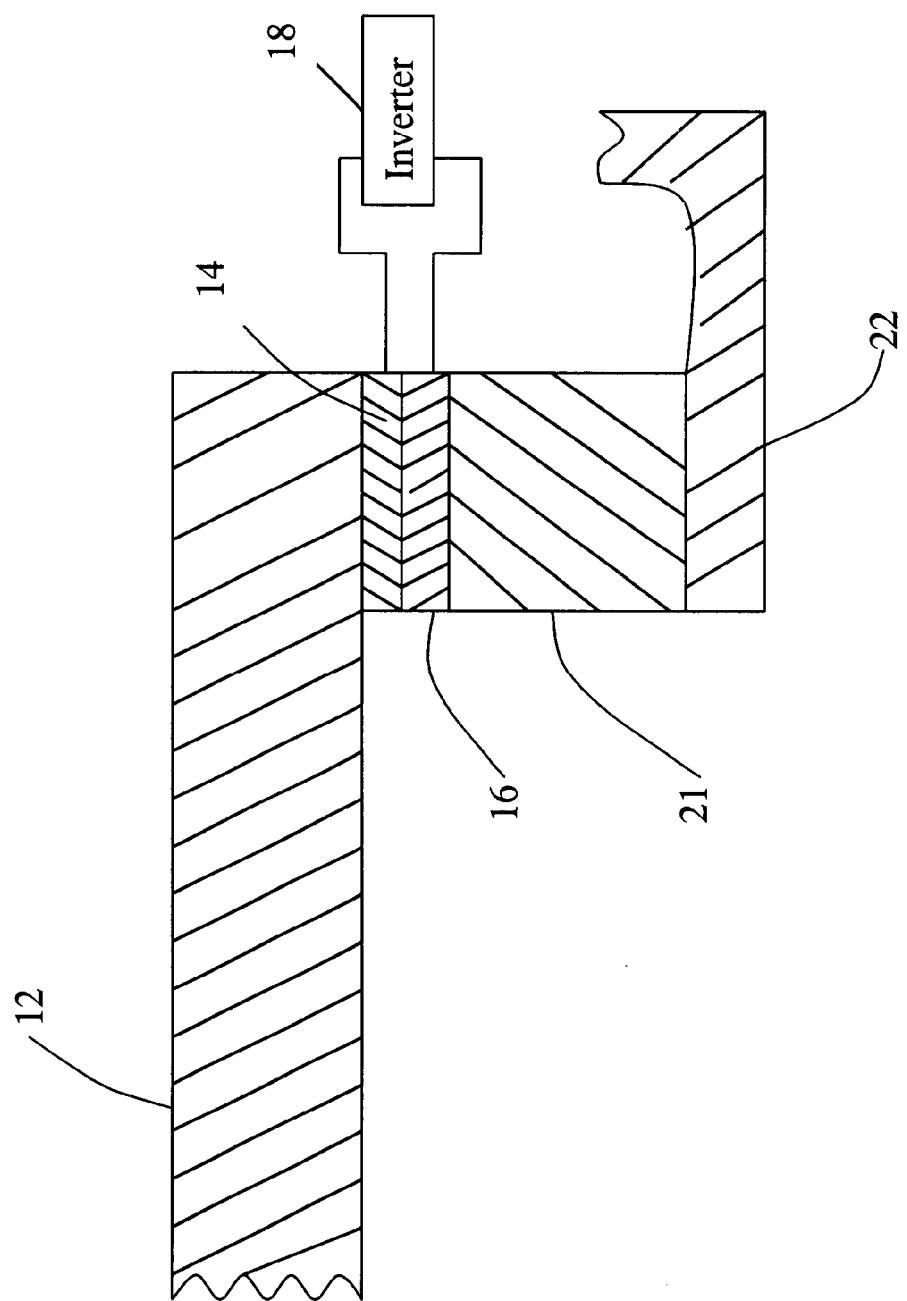
FIG. 2 is a cross-sectional view of a support region of the floor of an elevator cab incorporating the vibration control system of the present invention.

FIG. 2 illustrates a support for attaching the elevator platform 12 or floor to a carriage 22 configured to transport the elevator platform 12 along an elevator shaft. The vibration sensor 16 and vibration generator 14 are preferably connected in series with a passive vibration attenuator 21 such as, for example, an elastomer attached to the carriage 22. The passive vibration attenuator 21 is configured to attenuate vibration energy from the carriage 22. So arranged, the vibration forces transmitted from the carriage 22 are first attenuated by the passive vibration attenuator 21 and the remaining vibratory forces transmitted through the passive vibration attenuator 21 are detected by the vibration sensor 16. The inverter 18 inverts the signals from the vibration sensor 16 and outputs an inverted signal. The vibration generator 14, responsive to the inverted signal from the inverter 18, generates vibration forces to substantially cancel the vibration energy transmitted through the passive vibration attenuator 21.

It is contemplated that the vibration sensor 16 and vibration generator 14 form a unitary element.

It is also contemplated that the piezoelectric material may be attached to the carriage 22 and the passive vibration attenuator 21 is attached to the platform 12. Arranged in this manner, vibration energy from the carriage 22 is first attenuated by the piezoelectric material and then by the passive vibration attenuator 21.

It is further contemplated that the vibration sensor 16 and vibration generator 14 may be disposed between the passive vibration attenuator 22 and the platform 12. Optionally, the vibration generator 14 may be arranged as a laminate layer extending along and substantially across the platform 12 or disposed adjacent the vibration sensor 16 on the platform 12 and configured to surround the vibration sensor 16. It is also contemplated that the laminate layer may be constructed as a unitary or a plurality of discrete elements.

In use of the embodiment of FIG. 2, vibration energy having a plurality of frequencies is transmitted to the elevator carriage 22 from, for example, the elevator drive mechanism (e.g., motor, gears, cables, etc.). A portion of the vibration energy is first attenuated by the passive vibration attenuator 21. The remaining portion of the vibration energy, not absorbed by the vibration attenuator 21 and thus transmitted therethrough, is detected by the vibration sensor 16. The signal outputted by the vibration sensor 16 is fed to the inverter 18, which reverses or inverts the polarity of the signal and outputs an inverted signal to the vibration generator 14. The vibration generator 14 then outputs the requisite vibratory forces to substantially cancel out the vibration energy transmitted through the vibration sensor 16.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An apparatus for actively controlling transmission of vibration energy to a movable platform, the movable platform being mounted to a carriage for transporting the movable platform, comprising:

a vibration sensor, comprised of a first piezoelectric material, said vibration sensor being configured to generate an electrical signal in response to deformation of said vibration sensor caused by vibration energy;

an inverter for inverting said electrical signal from said vibration sensor and outputting an inverted electrical signal that is equal in magnitude and opposite in polarity to said electrical signal from said vibration sensor; and a vibration generator, responsive to said inverted electrical signal and connected in series with said vibration sensor, said vibration generator being comprised of a second piezoelectric material for transmitting a vibration force to substantially cancel the vibration energy transmitted to said vibration sensor thereby substantially isolating the movable platform from said vibration energy transmitted from the carriage.

2. The apparatus of claim 1, further comprising a passive vibration attenuator, mountable between the movable platform and the carriage, for passively absorbing vibration energy transmitted from the carriage.

3. The apparatus of claim 1, further comprising a low pass filter for filtering the electrical signal such that only preselected frequencies are transmitted therethrough without significant attenuation.

4. The apparatus of claim 1, wherein said vibration sensor and said vibration generator are formed as a unitary element.

5. The apparatus of claim 1, wherein the movable platform is a floor of an elevator cab.

6. The apparatus of claim 2, wherein said passive vibration attenuator is attachable to the carriage.

7. The apparatus of claim 1, wherein said vibration generator is attachable to the movable platform.

8. The apparatus of claim 2, wherein said vibration sensor is disposed between said vibration generator and said passive vibration attenuator.

9. The apparatus of claim 2, wherein said passive vibration attenuator comprises an elastomer.

10. The apparatus of claim 1, wherein said first piezoelectric material comprises a piezoceramic material.

11. The apparatus of claim 1, wherein said second piezoelectric material comprises a piezoceramic material.

12. The apparatus of claim 1, wherein said vibration generator forms a laminate layer of the movable platform.

* * * * *